(12) United States Patent
Roulet et al.

(10) Patent No.: US 11,528,464 B2
(45) Date of Patent: *Dec. 13, 2022

(54) WIDE-ANGLE STEREOSCOPIC VISION WITH CAMERAS HAVING DIFFERENT PARAMETERS

(71) Applicant: ImmerVision, Inc., Montreal (CA)

(72) Inventors: Patrice Roulet, Montreal (CA); Jocelyn Parent, Montreal (CA); Pierre Konen, Saint-Bruno (CA); Simon Thibault, Quebec (CA); Pascale Nini, Montreal (CA); Xiaojun Du, Montreal (CA); Valentin Batalle, Montreal (CA); Jhinseok Lee, Montreal (CA)

(73) Assignee: IMMERVISION, INC., Montreal (CA)

( * ) Notice: Subject to any disclaimer, the term of this patent is extended or adjusted under 35 U.S.C. 154(b) by 110 days.

This patent is subject to a terminal disclaimer.

(21) Appl. No.: 16/854,134

(22) Filed: Apr. 21, 2020

(65) Prior Publication Data

US 2020/0252596 A1 Aug. 6, 2020

Related U.S. Application Data

(63) Continuation of application No. 15/903,872, filed on Feb. 23, 2018, now Pat. No. 10,666,923.

(Continued)

(51) Int. Cl.
*H04N 13/246* (2018.01)
*H04N 13/25* (2018.01)
(Continued)

(52) U.S. Cl.
CPC ....... *H04N 13/239* (2018.05); *H04N 5/23238* (2013.01); *H04N 5/3572* (2013.01); *H04N 13/332* (2018.05)

(58) Field of Classification Search
CPC .. H04N 13/239; H04N 5/3572; H04N 13/332; H04N 5/23238
See application file for complete search history.

(56) References Cited

U.S. PATENT DOCUMENTS 5,495,576 A * 2/1996 Ritchey ................ H04N 13/344
348/E13.058
5,748,199 A * 5/1998 Palm .................... H04N 13/194
348/E13.058

(Continued)

FOREIGN PATENT DOCUMENTS

JP H11242283 * 7/1999 ............... G02B 7/08
JP H11242283 * 9/1999 ............... G02B 7/08

*Primary Examiner* — Philip P. Dang
(74) *Attorney, Agent, or Firm* — Panitch Schwarze Belisario & Nadel LLP

(57) ABSTRACT

A stereoscopic vision system uses at least two cameras having different parameters to image a scene and create stereoscopic views. The different parameters of the two cameras can be intrinsic or extrinsic, including, for example, the distortion profile of the lens in the cameras, the field of view of the lens, the orientation of the cameras, the positions of the cameras, the color spectrum of the cameras, the frame rate of the cameras, the exposure time of the cameras, the gain of the cameras, the aperture size of the lenses, or the like. An image processing apparatus is then used to process the images from the at least two different cameras to provide optimal stereoscopic vision to a display.

17 Claims, 9 Drawing Sheets

Related U.S. Application Data

(60) Provisional application No. 62/463,350, filed on Feb. 24, 2017.

(51) Int. Cl.
*H04N 13/239* (2018.01)
*H04N 5/232* (2006.01)
*H04N 13/332* (2018.01)
*H04N 5/357* (2011.01)

(56) References Cited

U.S. PATENT DOCUMENTS

| | | | | |
|---|---|---|---|---|
| 5,850,352 A * | 12/1998 | Moezzi | H04N 13/246 | 348/E13.058 |
| 5,936,663 A * | 8/1999 | Tabata | H04N 13/111 | 348/E13.067 |
| 6,393,144 B2 * | 5/2002 | Rogina | G06T 7/97 | 348/E13.071 |
| 6,516,222 B2 | 2/2003 | Fukuda et al. | | |
| 7,463,280 B2 * | 12/2008 | Steuart, III | H04N 13/246 | 348/42 |
| 7,894,440 B2 * | 2/2011 | Xu | H04L 45/00 | 370/392 |
| 8,350,902 B2 * | 1/2013 | Razzaque | H04N 7/181 | 348/77 |
| 8,434,909 B2 * | 5/2013 | Nichol | G02B 6/0018 | 362/296.01 |
| 8,521,411 B2 * | 8/2013 | Grabowski | G02B 27/0101 | 701/454 |
| 8,547,417 B2 * | 10/2013 | Pan | H04N 13/296 | 348/42 |
| 8,672,838 B2 * | 3/2014 | McDowall | A61B 1/00009 | 600/176 |
| 8,684,914 B2 * | 4/2014 | McDowall | H04N 5/2256 | 600/129 |
| 8,784,301 B2 * | 7/2014 | McDowall | H04N 5/2355 | 600/129 |
| 8,953,024 B2 * | 2/2015 | Wang | G06T 17/00 | 348/49 |
| 8,964,298 B2 * | 2/2015 | Haddick | G02B 27/017 | 359/630 |
| 9,269,022 B2 * | 2/2016 | Rhoads | G06V 10/772 | |
| 9,294,672 B2 * | 3/2016 | Georgiev | H04N 5/2253 | |
| 9,367,770 B2 * | 6/2016 | Footen | G06V 30/224 | |
| 9,516,222 B2 * | 12/2016 | Duparre | G02B 13/004 | |
| 9,541,740 B2 * | 1/2017 | Georgiev | G02B 13/006 | |
| 10,462,466 B2 * | 10/2019 | Abbas | H04N 13/00 | |
| 2004/0066555 A1 * | 4/2004 | Nomura | H04N 13/275 | 359/462 |
| 2011/0149050 A1 * | 6/2011 | Imada | H04N 13/239 | 348/51 |
| 2011/0292185 A1 * | 12/2011 | Takenaka | H04N 13/341 | 348/51 |
| 2012/0218301 A1 * | 8/2012 | Miller | G06Q 30/02 | 345/633 |
| 2013/0127980 A1 * | 5/2013 | Haddick | G06F 3/013 | 348/14.08 |
| 2013/0135449 A1 * | 5/2013 | Horii | H04N 13/225 | 348/49 |
| 2014/0327738 A1 * | 11/2014 | Jacobs | H04N 13/337 | 348/43 |
| 2015/0297311 A1 * | 10/2015 | Tesar | G06T 7/30 | 600/109 |
| 2016/0012643 A1 * | 1/2016 | Kezele | H04N 13/156 | 345/633 |
| 2016/0088287 A1 * | 3/2016 | Sadi | H04N 13/194 | 348/43 |
| 2016/0163110 A1 * | 6/2016 | Chang | G02B 27/0172 | 345/633 |
| 2016/0191887 A1 * | 6/2016 | Casas | H04N 13/111 | 348/47 |
| 2016/0379373 A1 * | 12/2016 | Givon | G06T 7/20 | 382/103 |
| 2017/0000329 A1 * | 1/2017 | Samec | A61B 5/14555 | |

* cited by examiner

WIDE-ANGLE STEREOSCOPIC VISION WITH CAMERAS HAVING DIFFERENT PARAMETERS

CROSS-REFERENCE TO RELATED APPLICATIONS

The present application is a continuation of U.S. patent application Ser. No. 15/903,872, filed Feb. 23, 2018, entitled "Wide-Angle Stereoscopic Vision With Cameras Having Different Parameters," currently pending, which claims the benefit of U.S. Provisional Patent Application No. 62/463,350, filed on Feb. 24, 2017, entitled "Wide-angle stereoscopic vision with cameras having different parameter," the entire contents of all of which are incorporated by reference herein.

BACKGROUND OF THE INVENTION

Embodiments of the present invention relate to an optical apparatus to capture multiples images of a wide-angle scene with multiples cameras having different imaging parameters. In existing systems, to create stereoscopic vision for a human observer, multiple identical cameras having identical lenses are used to capture the scene from several viewpoints and simulate the parallax view created by the distance from the human eyes. However, this perfect symmetry of both eyes is not representative of real human eyes, where one eye often has different imaging capabilities or defects than the other and one eye is more important because it has ocular dominance over the other when observing a scene. The present invention uses a combination of hardware cameras with different imaging parameters combined with software processing to optimally use the information from the multiples cameras with different parameters and present the optimal views to the user.

Existing stereoscopic vision system use two or more identical cameras generally having lenses with narrow angle FoV to image the scene and create stereographic views for an observer. There are some advantages to use identical cameras to observe in stereoscopy the scene, including direct compatibilities with display devices without further image processing. However, by using identical cameras, a lot of information is captured in double by the cameras just to create the geometrical difference in the images due to parallax. More useful information could be captured if different cameras instead of identical cameras were used in combination to image processing.

Some existing stereoscopic imaging system use identical wide-angle lenses to observe the scene and allow capturing more field of view than what is viewed by a user at a specific time, allowing the user to modify the display area inside the full field of view of the wide-angle lenses. However, even if these lenses have a good parallax vision based on their separation when looking in a central direction, these wide-angle lenses loose 3D vision when looking in the direction of the axis between the cameras because no more parallax information is present.

In existing stereoscopic vision systems, there are various challenges to offer a comfortable vision to a human observer considering that the ideal display parameters vary from one human observer to the other. The discomfort to users can be removed by further image processing to better calibrate the two displayed images to the user and mimic perfectly the human vision.

BRIEF SUMMARY OF THE INVENTION

To overcome all the previously mentioned issues, embodiments of the present invention use at least two cameras having different parameters to image the scene and create stereoscopic views. The different parameters of the two cameras can be intrinsic or extrinsic, including, but in no way limited to, the distortion profile of the lens in the cameras, the field of view of the lens, the orientation of the cameras, the positions of the cameras, the color spectrum of the cameras, the frame rate of the cameras, the exposure time of the cameras, the gain of the cameras, the aperture size of the lenses, or the like. An image processing apparatus is then used to process the images from the at least two different cameras to provide optimal stereoscopic vision to a display.

In a preferred embodiment according to the present invention, the difference between the at least two cameras is the distortion profile of the wide-angle lenses used or the resulting modified distortion profile of the camera after smart-binning by the sensor or the camera processing. One such example, when the lenses have different distortion profile, is when one of the wide-angle lens has a distortion profile with enhanced resolution in the central region of the field of view while the other wide-angle lens has a distortion profile with enhanced resolution toward the edges of the field of view. The images from these two cameras are then combined inside a processing unit. The final result is two images having a resolution in the whole field of view higher than the original resolution of each original image while keeping the geometrical differences due to parallax to create dual displays for a human interpreted by the brain as 3D vision. Another example, when the cameras themselves output images with different distortion profiles instead of due to differences in the lenses, is when the distortion of the image is modified either by smart-binning done by the sensor or by processing inside the camera that modify the distortion of the image before output. This type of distortion by the sensor or the camera can also be dynamics, changing in time according to the movement of objects in the field of view, the direction of gaze of the user, or the like.

In another embodiment of the present invention, the difference between the at least two cameras is the orientation of the optical axis which is offset between each other, meaning there is an angle between the cameras optical axis. This angle can be a large angle set voluntary or a small involuntary alignment error between the cameras. In this example embodiment, because of the tilt angle between the cameras, only a portion of the total field of view of each wide-angle lenses is used to image in double the scene for stereographic display and a part of the field of view is only visible to each camera. The images from these at least two cameras are then combined inside a processing unit. Since the processing unit knows the distortion profile of the wide-angle lenses and the difference of orientation between the cameras, the processing algorithm can create a full view of the scene for both eyes. The result is an enlarged total field of view of the system where only a part of the scene, sometime a desired region of interest, is imaged by both cameras and displayed in three dimensions.

In another embodiment of the present invention, the difference between the at least two cameras is the field of view of each lens, one being wider than the other. In this example embodiment, only a portion of the wider field of view imaged by the wider field of view camera is also imaged by the narrower field of view camera. The images from these two cameras are then combined inside a processing unit. Since the processing unit knows the field of view and distortion profile of each lens, the processing algorithm can create a full view of the scene for both eyes. In the part of the field of view imaged by both the wider and the narrower cameras, the processing algorithm display different views for each eye due to parallax difference from the multiple capturing position while in the part of the field of view seen by only the wider camera, the two generated views for the display are identical without any parallax difference. In some embodiment of the present invention, the resolution in pixels per degree in the narrower field of view camera is higher than in the wider field of view camera and more details can be identified from the narrower field of view camera. The processing algorithm then use the higher resolution from the narrower camera as well as the geometrical difference between the two resulting images due to the parallax difference from different capture point to create two views of higher resolution while keeping the geometrical differences due to parallax to generate 3D display.

In another embodiment of the present invention, the difference between the at least two cameras is the light spectrum of the cameras. One such example is when combining together a visible light camera to an infra-red light camera. The images from these two cameras are then combined inside a processing unit. Since the processing unit knows the field of view and distortion profile of each lens, the processing algorithm can create displays with a full view of the scene for both eyes. The geometrical differences due to the parallax from the two camera difference of capturing position can be calculated by the processing algorithm and depending on the application, the processed images using the textures from either the visible camera or the infra-red camera are displayed.

In another embodiment of the present invention, the difference between the at least two cameras is the frame rate. In this example embodiment, one camera could be a camera capturing a higher number of frames per second and the other a camera capturing a lower number of frames per second, including the limit case of using only a still image. The processing algorithm can then use the information from the higher frame rate camera to create the two required display for stereoscopic vision with a high frame rate and use the images from the camera having a lower number of frames per second to adjust the geometrical differences due to parallax and improve the display. This adjustment of 3D is limited by the lower frame rate camera and is done less often than at each frame of the higher frame rate camera.

In another embodiment of the present invention, the difference between the at least two cameras is either the exposure time, the gain or the aperture size (f/#). By having a different exposure time, gain or aperture size, the at least two cameras can see in a larger dynamic range. In one of the two resulting images, from the camera having a longer exposure time, a larger gain or a larger aperture (lower f/#), brighter objects might be over exposed while other darker objects would be perfectly exposed in this image. In the other image from the other camera, brighter objects would be perfectly exposed while darker objects would be under exposed. Even if some part of the images are over or under exposed, the geometrical differences due to a difference of capture position would still be visible to the processing algorithm. The processing algorithm can then produce two views for stereoscopic display using the whole high dynamic range captured from the multiple cameras while still keeping the parallax difference in the images.

In another embodiment of the present invention, the optical distortion of the two lenses in the two cameras are configured so that the outputted images are already pre-distorted in exactly the same distorted way required for the display unit, for example in an augmented reality device or a see-through device. This allow to display the images from the cameras to a user without any lag or delay associated to image processing to create the required distorted images compatible with the display. In this embodiment, each camera can be different to account for the difference between the left and the right eye of the observer that would be otherwise processed in a usual display without pre-distortion lenses. One example embodiment of the present invention is a see-through device made from fixing a mobile phone. On this mobile phone, the two cameras are placed on the back of the device and the front of the device has a display. When using the mobile phone inside a cardboard virtual reality headset or the like, the result can be an augmented reality presenting the content from each camera to each eye without further image distortion processing inside the phone.

In a last embodiment of the present invention, the cameras used for stereoscopic vision could combine multiple of the above difference of parameters. For example, not in any way limiting the possible combinations of the above embodiments, two user could use their mobile device each having a camera looking at a scene with some overlap. The cameras could have different distortion profile, field of view, orientation, exposure setting, frame rate and spectrum all at the same time. By providing all the information about each camera to the processing algorithm, it can then properly detect which zone overlap and create two optimal views to be displayed to a user and see 3D in only the part of the field of view imaged by multiples cameras.

In all of the above embodiments, the processing algorithm receives and process the image from the at least two cameras having different parameters. Since the processing algorithm knows the exact parameters of the cameras (field of view, resolution, distortion, orientation, color spectrum, etc), the processing algorithm can reconstruct dual 2D views generated exactly for a display specific to each eye in an stereoscopic display system while using the optimal information from each camera. In some embodiment, while reprocessing the distortion to create 2D views, the processing algorithm can correct small alignment error (unwanted tilt) of the camera by modifying distortion of the displayed images and can be used to enhance the calibration between stereoscopic cameras. When viewed by a human, the brain then interpret these dual 2D views as a normal vision of a 3D scene.

The processing algorithm can also adjust the 2D views generated for each eye to account for movement of the stereoscopic display with respect to a central initial point. When the display is in an initial central position, the amount of parallax visible in the objects seen by the at least two cameras is due to the distance from the two capture positions. When the display move, for example when the head of an user for a virtual reality headset move up, down, left, right, forward or backward, the processing algorithm can adjust the distortion of the generated display to compensate for the head movements, giving the illusion of moving inside the displayed images even if the cameras that captures the original images are at fixed positions.

In all of the above embodiments, the at least two different cameras as well as the processing algorithm can be on the same device or on different devices. Some examples of devices that can be equipped with either these cameras, processing algorithm or both include, but in no way limited to, a smartphone, a standalone camera, a virtual reality display device, an augmented reality display device or the like.

In all of the above embodiments, in addition to using the at least two cameras to capture the scene with parallax information used to calculate 3D information about the scene and create an apparent 3D view by generating a different 2D view for each display, the processing algorithm can further enhance the 3D information of the scene by using information from any source.

In stereoscopic vision systems, the positions of the cameras allow to change the perception of user observing the display. For example, when the cameras are positioned at a low height compared to his eyes, the user looking at the stereoscopic display will have the feeling of being shorter than he is. Alternatively, when the cameras are positioned above the height of his eyes, looking at the stereoscopic display will create the feeling of being taller. In some embodiments of the present invention, by using pairs of cameras at various heights on a device allows the final user to choose the desired point of view, short or tall. This can be used to better understand the point of view of someone else like a small kid, a person sitting in a wheelchair, or a very tall person. Combined with the processing algorithm according to the present invention, the display can smoothly switch from a display to the other, including positions between the cameras using a processed display position.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
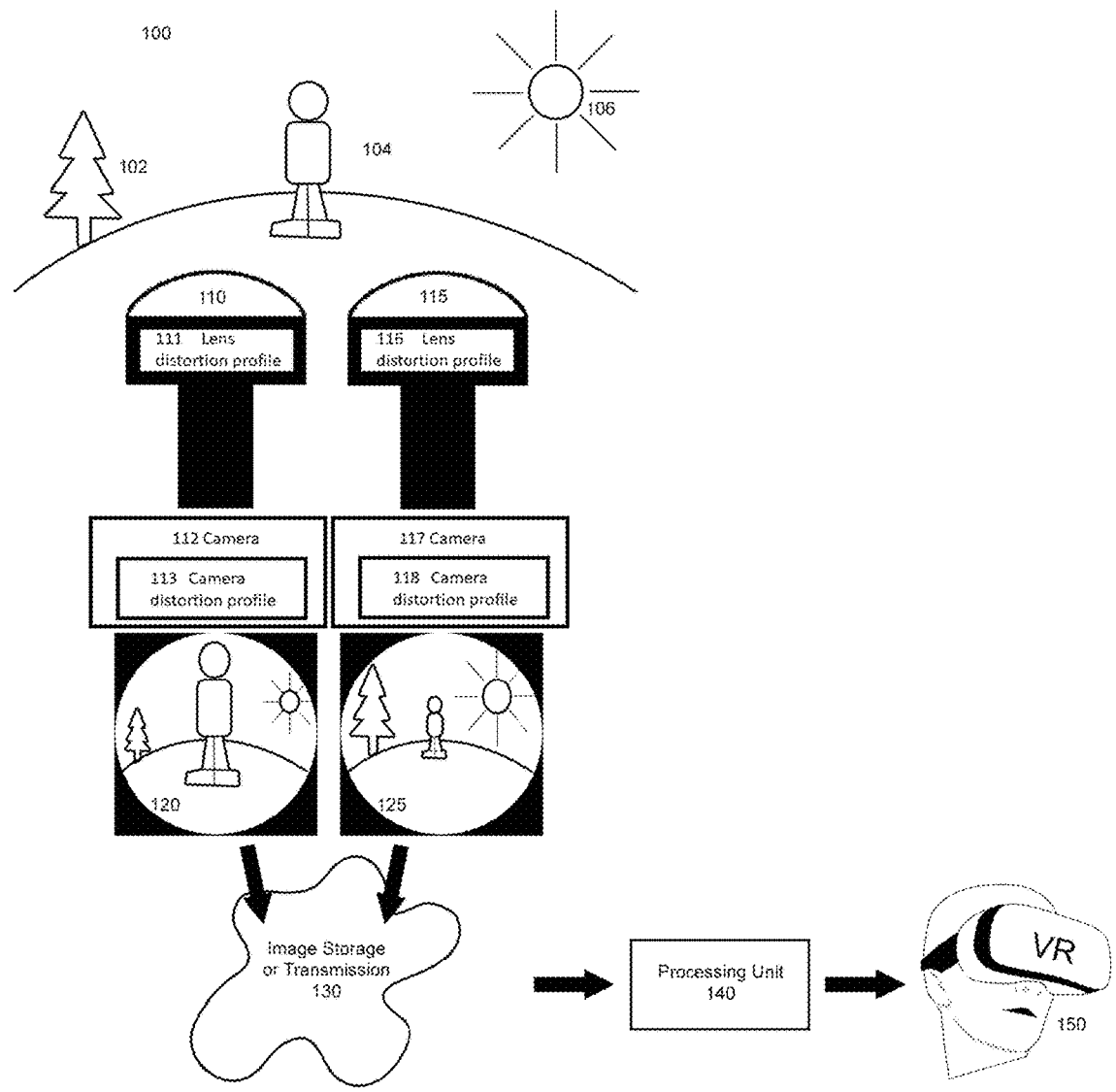
FIG. 1 is an embodiment of the present invention where the difference between the cameras is the distortion profile of the lenses.

FIG. 1 shows an embodiment according to the present invention where the difference between the at least two cameras is the distortion profile of the lenses. In some embodiments of the present invention, the difference of distortion profile between the at least two cameras is such that the output resolution from the cameras has a difference of at least 10% in angular resolution for at least one angular field. This angular field is represented by an object far away in the scene such that it is imaged by both cameras at the same angular position relative to their optical axis. The at least 10% angular resolution difference can be measured in pixels/degree in the output image, in micrometers/degree in the image plane or by any other similar unit of measurement where a ratio of a distance on the image plane by a unit of an angular displacement in the object scene relative to an optical axis is used. This method for measuring the difference of distortion between the two cameras is just an example and other methods can be used to measure an intentional difference of the distortion of the lenses or the cameras according to the present invention.

A scene 100 comprises of multiples objects 102, 104 and 106 to be imaged by at least two cameras. In this example, both the cameras have a wide-angle field of view, but this is not a requirement according to the present invention. The camera 112 with lens 110 has a distortion profile 111 with increased magnification in the center of the field of view and lower magnification toward the edges, creating the image 120. The image of the human person 104 is in the center and hence with high resolution or bigger, while the image of the tree 102 and of the sun 106 are in lower resolution, or smaller. The camera 117 with lens 115 has a distortion profile 116 with increased magnification toward the edges of the field of view and lower magnification in the center, creating the image 125. The image of the human person 104 is in the center and hence with lower resolution, while the image of the tree 102 and of the sun 106 are in higher resolution. The images 120 and 125 from the two cameras 112, 117 are then stored or transmitted at 130 to be used now or later by the processing unit 140. This transmission can be internally inside a device integrating the cameras, the processing unit and the display or it can be across multiples devices via a communication link, including a connection by a wire or over the Internet. The processing unit 140 can be a hardware or a software implementation having the algorithm to combine the two images. The distortion profile 111, 116 of the two lenses 110, 115 are known to the processing unit either because it was transmitted with the images via a marker or a metadata or because the processing unit was pre-configured with the distortion profiles 111, 116 of the lenses 110, 115. In addition to information from the cameras 112, 117, the processing unit 140 can also receive any other external information to improve the processing of the images, including information from a database, from a user or from an artificial intelligence algorithm having processed past images via deep learning techniques or other artificial intelligence learning techniques. Since the distortion profile 111, 116 of the two lenses 110, 115 are perfectly known to the processing unit 140, the processing algorithm can create dewarped views for each eye removing all the distortion from each lenses 110, 115 or modifying the distortion as required. The resulting difference in geometry in the dewarped views are due to parallax difference between the two cameras 112, 117 capturing the scene from different locations and can be used to create the depth perception in the stereographic view. The processing algorithm then further enhances the central resolution of the view coming from the lens having an enhanced resolution toward the edge by using the information from the other camera having enhanced resolution toward the center. The same is done for the other view. The final result from the processing unit 140 is two images having a resolution in the whole field of view higher than the original resolution of each original image while keeping the geometrical differences due to parallax. The two images are then transferred to a display unit 150 that present to a human observer the two stereoscopic views with enhanced resolution compared to the originally captured images. In another embodiment of the present invention, instead of the lens 110 and 115 having a different distortion 111, 116, the images with different distortion 120 and 125 can be outputted from the cameras themselves. The different distortion in the images 120 and 125 is then resulting from processing inside the cameras where a higher resolution image is compressed on the side at image 120 and in the center at image 125. This can be done by either software or hardware processing of the original images received by the camera of by smart-binning by the sensor where the sensor down-sample the resolution in a part of the image by combining multiples pixels together. Then, as with the case where the difference of distortion is produced by the lenses, the output images are stored or transmitted at 130 to be used not or later by the processing unit 140 until displayed at 150. This type of distortion 113, 118 modified inside the cameras 112, 117 by sensor smart-binning, hardware or software processing or by an active optical mean can also be dynamics, changing the distortion in time according to the movement of objects in the field of view, the direction of gaze of the user, or the like.

In some embodiments of the present invention, the resulting resolution of the two displayed images are not equal, with a higher resolution image displayed to the eye of the user having ocular dominance. The dominant eye is the eye from which visual input are preferred from the other eye by the brain.

Figure 2:
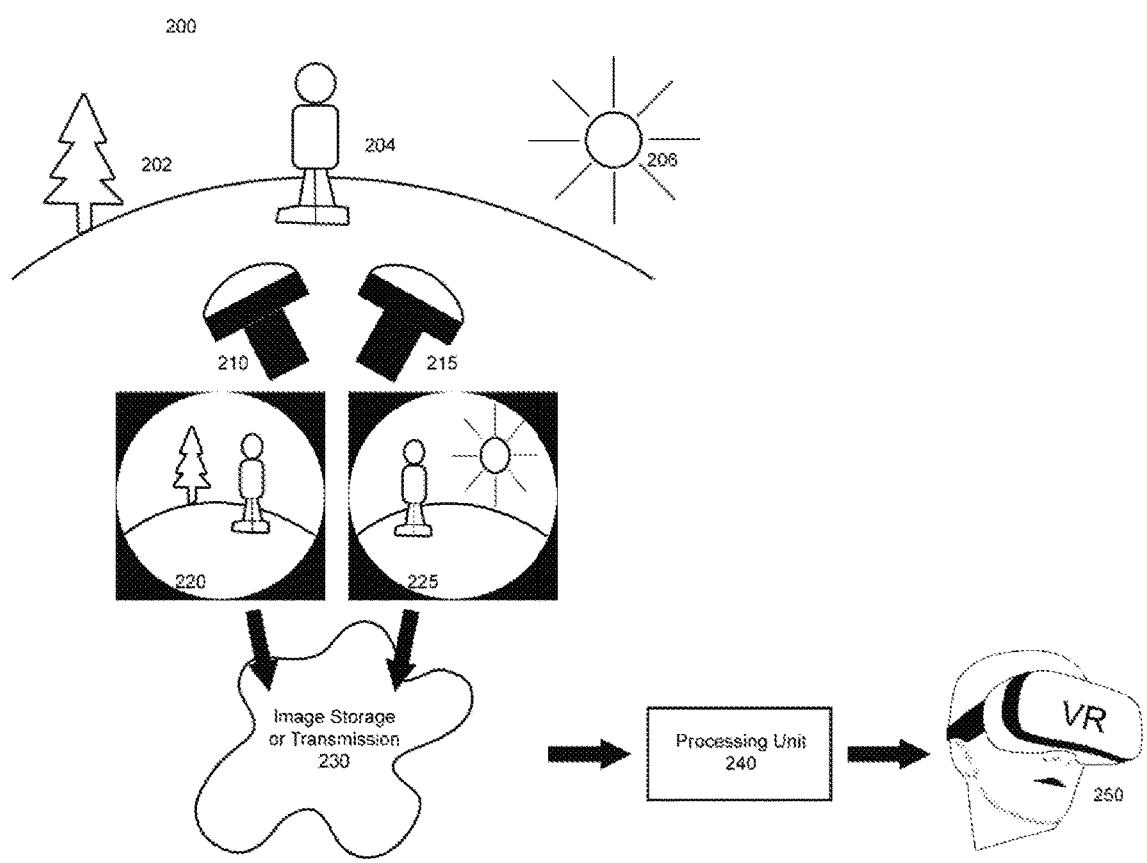
FIG. 2 is an embodiment of the present invention where the difference between the cameras is the orientation of the optical axis of the lenses.

FIG. 2 shows an embodiment according to the present invention where the difference between the at least two cameras is the orientation of the optical axis of the lenses inside the cameras. A scene 200 comprises of multiples objects 202, 204 and 206 in a scene to be imaged at least partially by at least two cameras. In this example figure, the lens 210 is tilted intentionally or not toward the left of the image while the lens 215 is tilted intentionally or not toward the right of the image. In other embodiments, the tilt angle between the 2 cameras could also be negative instead of positive, with the cameras facing inward instead of outward. The resulting image 220 from lens 210 can image the tree 202 and the human 204, but cannot see the sun 206. The resulting image 225 from lens 315 can image the human 204 and the sun 206, but not the tree 202. The images 220 and 225 from the two cameras are then stored or transmitted at 230 to be used now or later by the processing unit 240. The processing unit 240 can be a hardware or a software implementation having the algorithm to combine the two images. The exact orientation of the two lenses are known to the processing unit either because it was transmitted with the images via a marker or a metadata or because the processing unit was pre-configured with the orientation of the lenses. In the part of the field of view imaged by both lenses, as the human 204 in this example, the processing algorithm 240 creates different views for each eye due to parallax difference from the multiple capturing position. In the part of the field of view seen by only one camera, as the tree 202 or the sun 206 in this example, the generated views for the display are identical without any parallax difference. The final result is two views transmitted to the display device 250 that are either in 2D or 3D depending on the direction the user looks at. The transition between the 2D and 3D viewing area is minimized via a blend to avoid discomfort to the human observer.

In some embodiments of the present invention, the missing 3D information in the part of the scene image by only a single lens can be obtained via an additional source. The processing unit can then use this additional information to further reconstruct the 3D scene and extend the part of the scene viewed in 3D.

Figure 3:
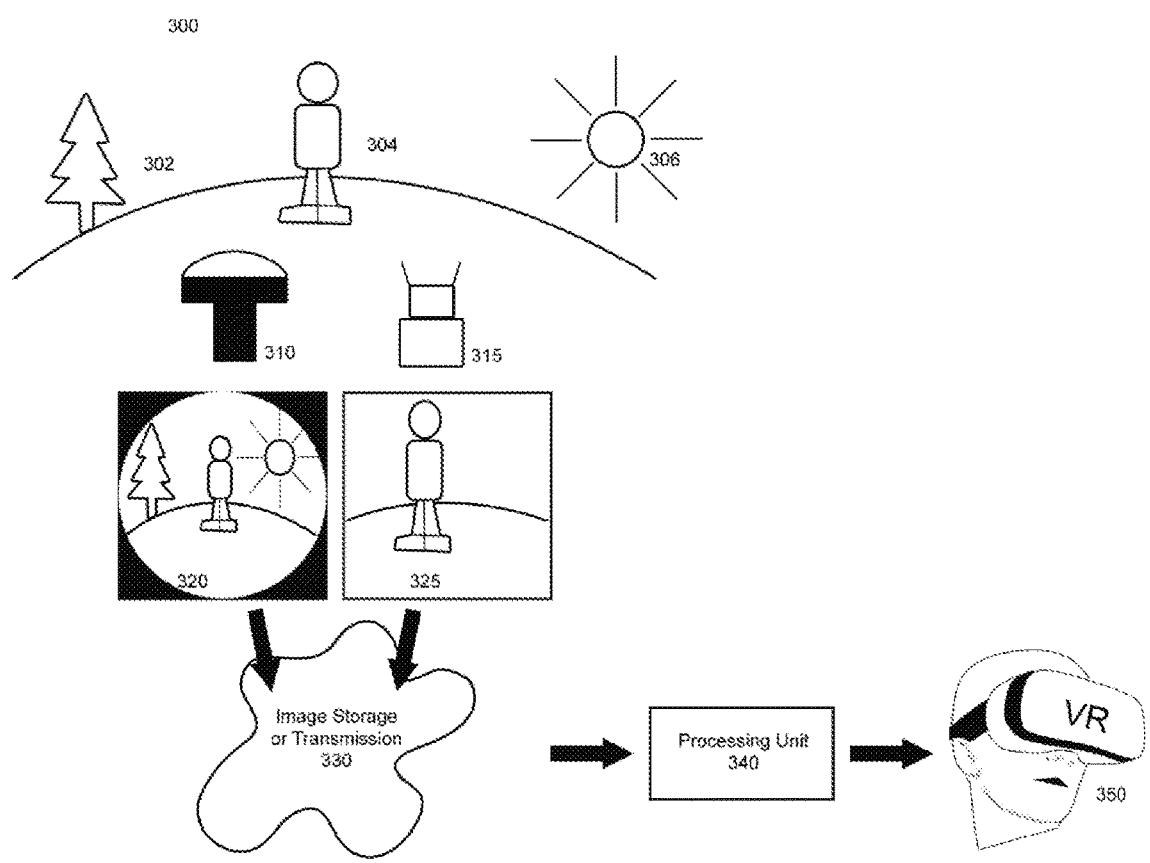
FIG. 3 is an embodiment of the present invention where the difference between the cameras is the field of view of the lenses.

FIG. 3 shows an embodiment according to the present invention where the difference between the at least two cameras is the field of view of the lenses. A scene 300 comprises of multiples objects 302, 304 and 306 to be imaged fully by the wide-angle lens 310 and partially by the narrow-angle lens 315. The resulting image from lens 310 is image 320 where the tree 302, the human 204 and the sun 306 are all visible. The resulting image from the lens 315 is image 325 where only the human 304 is visible. Because the lens 310 is wide-angle, the average resolution in pixels/degree for imaged objects is generally lower than with the narrow-angle lens 315. For the image of the human 304, in addition to the geometrical difference between the images due to parallax from the different capturing positions, the resolution is higher in image 325 than 320. The images 320 and 325 from the two cameras are then stored or transmitted at 330 to be used now or later by the processing unit 340. The processing unit 340 can be a hardware or a software implementation having the algorithm to combine the two images. The exact field of view of the two lenses are known to the processing unit either because it was transmitted with the images via a marker or a metadata or because the processing unit was pre-configured with the field of view of the lenses. In the part of the field of view imaged by both lenses, as the human 304 in this example, the processing algorithm 340 creates different views for each eye due to parallax difference from the multiple capturing position. Since the resolution is generally different between the two images, the textures from the highest resolution image available are used to generate the two views in higher resolution in the part of the field of view images by multiples cameras. In the part of the field of view imaged only by the wide-angle lens, as in the tree 302 and the sun 306, both views generated are identical and are generated from the image 320. The two generated views are then transmitted to the display unit 350. The transition between the 2D and 3D viewing area and higher to lower resolution viewing area is minimized via a progressive blend along the images to avoid discomfort to the human observer. In other embodiments, the 3D in the part of the field of view imaged only by the wide-angle lens can be can be generated by A.I. processes analyzing the scene, software or hardware processes or manual adjustment. In this case, even outside of the narrow-angle field of view, the two generated views for display are different using this 3D information.

Figure 4:
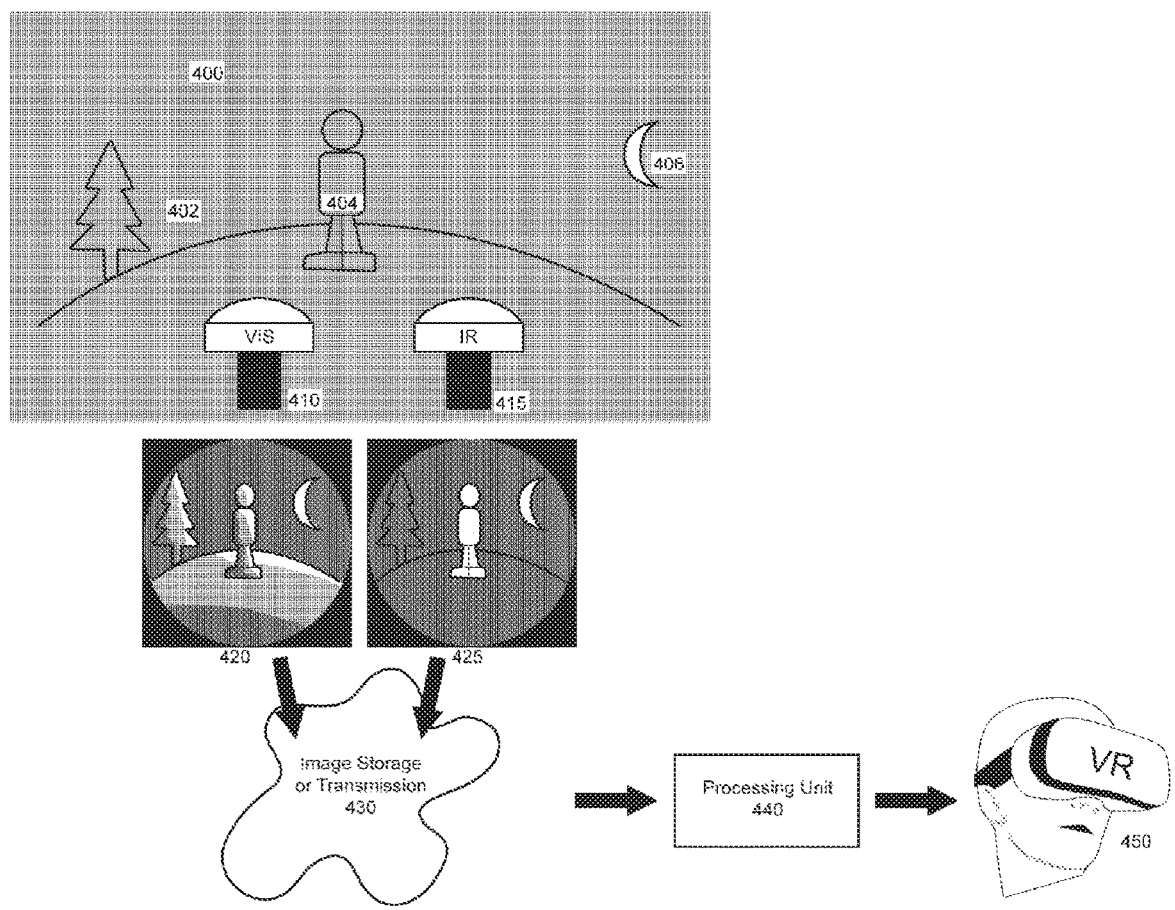
FIG. 4 is an embodiment of the present invention where the difference between the cameras is the color spectrum.

FIG. 4 shows an embodiment according to the present invention where the difference between the at least two cameras is the color spectrum of the lenses. A scene 400 comprises of multiples objects 402, 404 and 406 to be imaged fully in the visible spectrum by the wide-angle lens 410 and imaged fully in the infra-red spectrum by the wide-angle lens 415. In this example, the pictures are taken in low-light conditions and the image 420 resulting from the visible camera can barely identify the human 404 because of the low light. However, the human 404 is at a higher temperature than its surrounding and emit a lot of infra-red light. In the image 425 from the infra-red lens 415, the human 404 is easily visible. The images 420 and 425 from the two cameras are then stored or transmitted at 430 to be used now or later by the processing unit 440. The processing unit 440 can be a hardware or a software implementation having the algorithm to combine the two images. The color spectrum of the two lenses are known to the processing unit either because the information was transmitted with the images via a marker or a metadata or because the processing unit was pre-configured with the color spectrum of the lenses. When creating the two views for stereoscopic display, the processing algorithm 440 creates different views for each eye due to parallax difference from the multiple capturing position. When an object is clearly more visible in one of the two images, as the human 404 clearly more visible in image 425 than in image 420, the processing unit display the same content on both generated displays for 2D view. When an object is visible in both the visible and infra-red spectrum as the moon 406, the processing unit combine the geometrical difference between the objects to create a difference of parallax in the generated views. The textures to be displayed in the final output are either from the visible or the infra-red lens depending on the application. The two generated views are then transmitted to the display unit 450.

Figure 5:
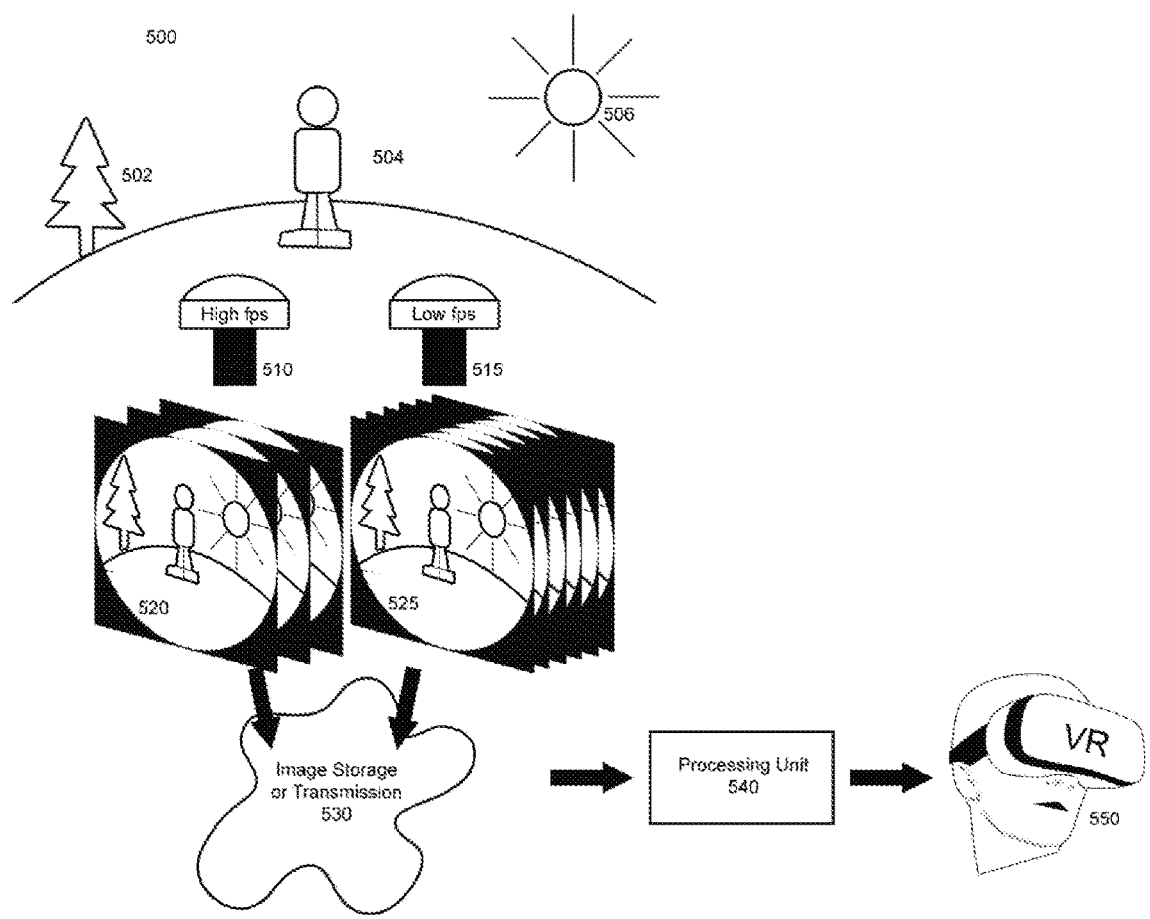
FIG. 5 is an embodiment of the present invention where the difference between the cameras is the frame rate of the cameras.

FIG. 5 shows an embodiment according to the present invention where the difference between the at least two cameras is the frame rate of the cameras. A scene 500 comprises of multiples objects 502, 504 and 506 to be imaged by at least two cameras. In this example, both the cameras have a wide-angle field of view. The camera with lens 510 can capture images at a lower frame rate, creating the images 520. The camera with lens 515 can capture images at a higher frame rate, creating the images 525. The images 520 and 525 from the two cameras are then stored or transmitted at 530 to be used now or later by the processing unit 540. Since the number of frame in 520 is lower than the number of frame 525, the processing unit use mainly the images 525 to generate at a high frame rate the two images to display. When the processing unit receive a new image 520 from the lower frame rate camera, it can update the parallax information for the next few generated images until a new image is received from the lower frame rate camera. When a new image 520 is received, the parallax information are again updated. In some applications, the lower frame rate camera can be a camera providing only a single static frame 520 and the processing algorithm use it only to calculate the geometrical differences between the single image 520 and all the high frame rate images 525. In another embodiment, the lower speed camera could be activated only when movement is detected in the image from the higher speed camera. The inverse could also be done, with the higher speed camera activated or the frame rate increased only when movement is detected in the lower frame rate camera. The two generated views are then transmitted to the display unit 550.

Figure 6:
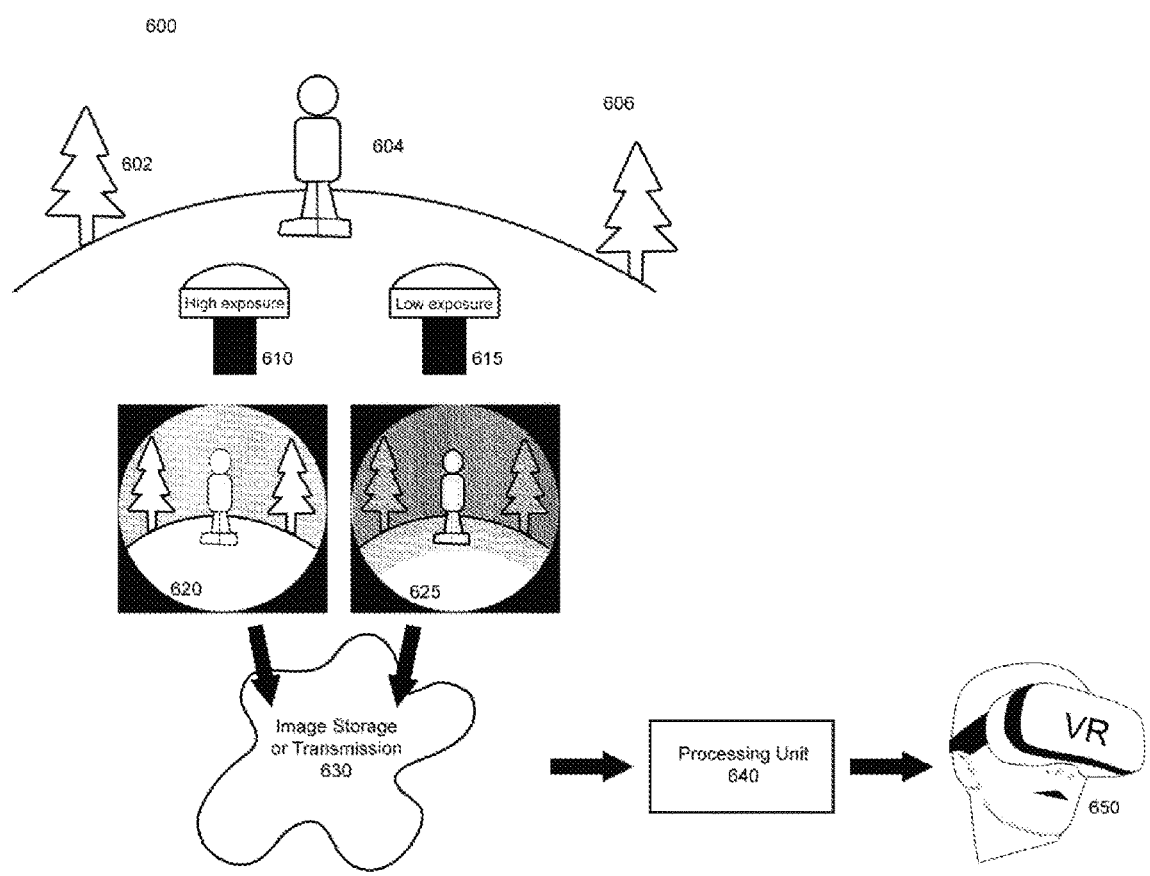
FIG. 6 is an embodiment of the present invention where the difference between the cameras is the exposure, the gain and/or the aperture size of the lenses.

FIG. 6 shows an embodiment of the present invention where the difference between the cameras is the exposure, the gain and/or the aperture size of the lenses. By having a different exposure time, gain or aperture size, the at least two cameras can see in a larger dynamic range. A scene 600 comprises of multiples objects 602, 604 and 606 to be imaged by at least two cameras. The camera 610 having a longer exposure time, a larger gain or a larger aperture (lower f/#) creates image 620. In image 620, brighter objects as the human 604 might be over exposed while other darker objects like the tree 602 and 606 would be perfectly exposed in this image. The camera 615 having a shorter exposure time, a smaller gain or a smaller aperture (higher f/#) creates image 625. In image 625, brighter objects as the human 604 would be perfectly exposed while darker objects like the tree 602 and 606 would be underexposed. The images 620 and 625 from the two cameras are then stored or transmitted at 630 to be used now or later by the processing unit 640. Even if some part of the images are over or under exposed, the geometrical differences due to a difference of capture position would still be visible to the processing algorithm and it can create the corresponding parallax difference in the images. For the texture, the processing algorithm uses the part of the images 620 or 625 with perfect exposure to generate the two display, creating an output with a higher dynamic range than the two original cameras themselves. The two generated views are then transmitted to the display unit 650, having an higher dynamic range (HDR) than each individual original images.

Figure 7:
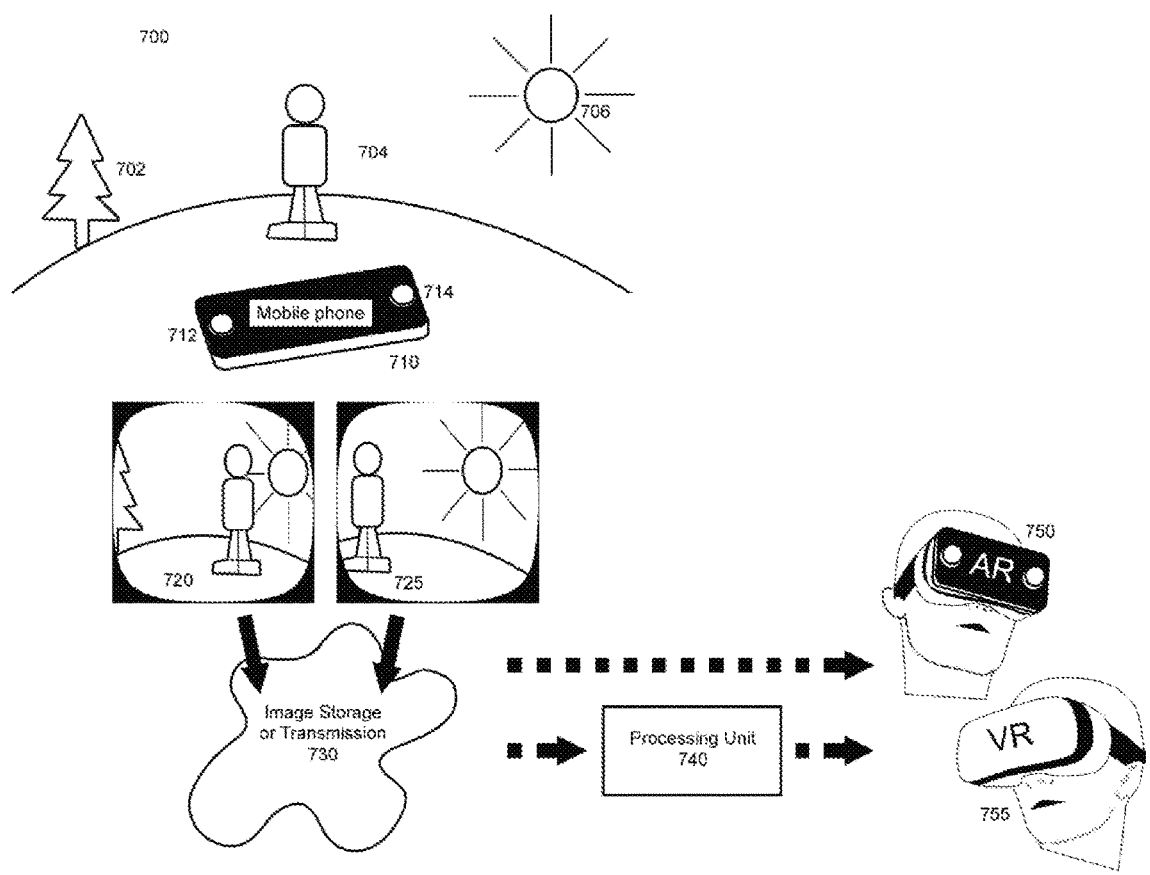
FIG. 7 is an embodiment of the present invention where the difference between the cameras is the distortion profile of the lenses, with both distortion profile designed exactly to reduce processing for a display without delay.

FIG. 7 shows an embodiment of the present invention where the difference between the cameras is the distortion profile of the lenses, with both distortion profile designed exactly to reduce processing for a display without delay. A scene 700 comprises of multiples objects 702, 704 and 706 to be imaged by at least two cameras. In one example according to the present embodiment, in no way limiting the scope of the invention, two cameras 712 and 714 are located on the back of a mobile phone device 710. The lens 712 is designed to output directly the image 720 with the distortion and field of view matching the requirement of the left eye at display 750 and 755. The lens 714 is designed to output directly the image 725 with the distortion and field of view matching the requirement of the right eye at display 750 and 755. This way, the distortion profiles allows to minimize or to avoid completely the distortion processing before they are displayed. The images 720 and 725 from the two cameras are then stored or transmitted at 730 to be used now or later. Since the distortion of the output from the lens is already pre-distorted to match the requirements of the display 750 and 755, the transmission can be directly from storage 730 to display 750 or 755 without using the processing unit 740. In other embodiments, the lens having distortion matching the requirement of the display can be combined to any other difference of parameter described before and in this case the optional processing unit 740 can be used for optimal display even with the difference of parameter. The front of the mobile phone device 710 can be used as the display when the phone is inserted inside a cardboard viewer to create a real-time augmented reality system 750 with see-through capabilities or a playback virtual reality system 755. In another embodiment, the difference between the cameras is the distortion profile outputted from the cameras instead of the distortion profile of the lenses. The different distortion in the images 720 and 725 is then resulting from processing inside the cameras to create the desired pre-distorted images. This can be done by either software or hardware processing of the original images received by the camera of by smart-binning by the sensor where the sensor down-sample the resolution in a part of the image by combining multiples pixels together.

Figure 8:
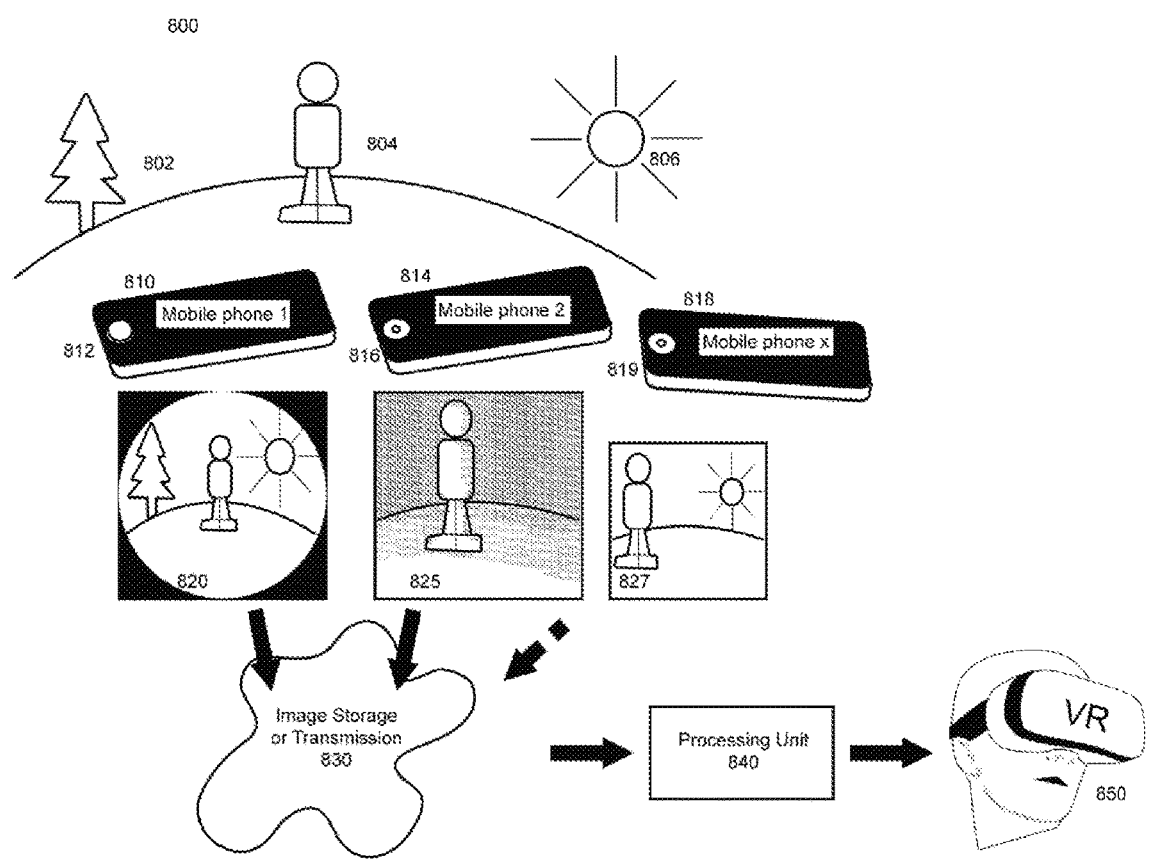
FIG. 8 is an embodiment of the present invention where multiples differences between the cameras are combined.

FIG. 8 shows an embodiment where several difference of parameters are combined according to the present invention. A scene 800 comprises of multiples objects 802, 804 and 806 to be imaged by at least two cameras 812 and 816 located on two different devices, respectively 810 and 814. The invention is not limited to two cameras and additional cameras can be used as the mobile phone 818 having camera 819. The camera 812 produces the image 820 having a wide-angle field of view, its unique distortion profile, a normal exposure, a high resolution image and a central orientation. The camera 816 produces image 825 with a narrow field of view, its unique distortion profile, a lower exposure, a high resolution image and a central orientation. The optional camera 819 produces image 827 with a narrow field of view, its unique distortion profile, a normal exposure, a lower resolution image and a tilted orientation toward the right. The images 820, 825 and other optional images 827 from the at least two cameras are then stored or transmitted at 830 to be used now or later by the processing unit 840 that generate two optimal views and then transmits them to the display unit 850.

Figure 9:
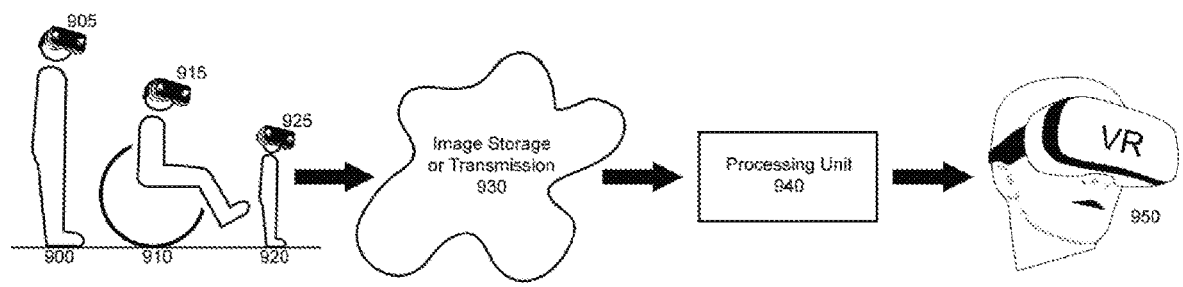
FIG. 9 is an embodiment of the present invention where the difference between the cameras is the height of the capture.

FIG. 9 shows an embodiment of the present invention where the difference between the cameras is the height of the capture to represent various cases of seeing vision through the eyes of someone else. The stereoscopic images are captured by a capture device 905, 915 or 925 at the height of the eyes of various people. In this example figure, in no way limiting the scope of this invention, the people capturing are either a tall adult 900, a sitting person or someone in a wheel chair 910 or kid or a short person 920. The images from the capture devices 905, 915 or 925 are then stored or transmitted at 930 to be used now or later by the processing unit 940. The final observer 950 looking at the display through a virtual reality device can then see the point of view of any of the people 900, 910 or 920 as desired.

In some embodiments according to the present invention, instead of generating two output images for display to a human using a head-mounted virtual reality headset, an augmented reality headset or a mobile device inserted in a headset, the processing unit uses the images from the stereoscopic vision system to analyze the scene and output the resulting analysis to an algorithm unit. This algorithm unit can be any unit capable of analyzing the images, including, but not limited to, a software algorithm, a hardware algorithm or an artificial intelligence unit based or not on a neural network and trained or not via deep learning techniques or the like. The algorithm unit can then automatically use the information extracted from the at least two different images and processed by the processing unit for any application it requires, including for generating distance information about a scene including information about distance from a origin point, to generate higher quality image with enhanced image quality using information extracted from the algorithm unit, to generate information used in an artificial intelligence algorithm including artificial intelligence algorithm trained via deep learning neural networks or the like or to generate a single image with superposed left eye and right eye images to be separated via active or passive glasses, either color filter, polarized glasses, synchronized shutter glasses or the like.

All of the above are figures and examples of specific image distortion transformation units and methods. In all these examples, the imager can have any field of view, from very narrow to extremely wide-angle. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What we claim:

1. An image acquisition system for capturing a scene, the system comprising:
    a. a first camera having a plurality of first imaging parameters and a first capture position relative to the scene, the first camera being configured to capture a first output image of the scene;
    b. a second camera having a plurality of second imaging parameters and a second capture position relative to the scene, the second camera being configured to capture a second output image of the scene, the first and second capture positions being different from each other, one or more of the first imaging parameters being different from a corresponding one or more of the second imaging parameters, the first and second output images being different from each other according to the differing first and second capture positions and the one or more differing first and second imaging parameters;
    c. a processing unit connected to the first and second cameras, the processing unit being configured to:
        i. receive the first and second output images from respective first and second cameras, and
        ii. process the first and second output images according to a geometrical difference due to parallax from the first and second capture positions and according to any remaining differences due to the one or more differing first and second imaging parameters, in order to produce first and second processed images,
    wherein the one or more differing first and second imaging parameters includes at least a difference in lens distortion profiles between the first and second cameras or a difference in camera distortion profiles between the first and second cameras, wherein the first camera has a camera distortion profile or a first lens of the first camera has a lens distortion profile with increased magnification in a first zone of a field of view and the second camera has a camera distortion profile or a second lens of the second camera has a lens distortion profile with increased magnification in a second zone of the field of view, the second zone being different than the first zone, and
    wherein, to create at least one combined image, the processing unit is further configured to at least one of:
        (1) combine information from the first output image outside of the first zone of the field of view with information having increased magnification from the second camera, or
        (2) combine information from the second output image outside of the second zone of the field of view with information having increased magnification from the first camera,
    wherein the processing unit is further configured to:
        iii. pre-store difference information regarding the difference in the field of view of each of the first and second cameras,
        iv. receive manual input of the difference information from a user, or
        v. receive the difference information from the first and second cameras written in a marker and/or metadata.

2. The system of claim 1, further comprising at least one display for displaying the first and second processed images.

3. The system of claim 2 wherein the at least one display is on one of a head-mounted virtual reality headset, an augmented reality headset, or a mobile device capable of insertion into a headset.

4. The system of claim 1 wherein the first and second capture positions are modifiable to change the desired view of the scene.

5. The system of claim 1, wherein the at least one combined image has enhanced image resolution.

6. The system of claim 1, wherein the at least one combined image includes 3D information.

7. An image acquisition system for capturing a scene, the system comprising:
   a. a first camera including one or more lenses creating a first distortion profile, the first camera having a first capture position relative to the scene and being configured to capture a first output image of the scene;
   b. a second camera including one or more lenses creating a second distortion profile different from the first distortion profile, the second camera having a second capture position relative to the scene and being configured to capture a second output image of the scene, the first and second capture positions being different from each other, the first and second output images being different from each other according to the differing first and second capture positions and the differing first and second distortion profiles; and
   c. a processing unit configured to create at least one combined image by at least one of:
      i. combining information from the first output image outside of a first zone of a field of view with information having increased magnification from the second camera, or
      ii. combining information from the second output image outside of a second zone of the field of view different from the first zone with information having increased magnification from the first camera,
   wherein the first and second distortion profiles respectively match requirements of a left eye and a right eye of a user at a display and are configured to minimize or avoid completely the processing of the distortion in the first and second images before they are displayed to the user, wherein difference information regarding the difference in the first and second lens distortion profiles of the first and second cameras is pre-stored, received from a user, or received from the first and second cameras written in a marker and/or metadata.

8. The system of claim 7, further comprising at least one display configured to display the first and second output images.

9. The system of claim 8 wherein the at least one display is on at least one of a head-mounted virtual reality headset, an augmented reality headset, or a mobile device capable of insertion into a headset.

10. The system of claim 7 wherein the first and second capture positions are modifiable to change the desired view of the scene.

11. An image acquisition system for capturing a scene, the system comprising:
   a. a first camera creating a first distortion profile either via smart-binning by a sensor or via processing inside the camera, the first camera having a first capture position relative to the scene and being configured to capture a first output image of the scene;
   b. a second camera creating a second distortion profile either via smart-binning by a sensor or via processing inside the camera, the second distortion profile being different from the first distortion profile, the second camera having a second capture position relative to the scene and being configured to capture a second output image of the scene, the first and second capture positions being different from each other, the first and second output images being different from each other according to the differing first and second capture positions and the differing first and second distortion profiles; and
   c. a processing unit configured to create at least one combined image by at least one of:
      i. combining information from the first output image outside of a first zone of a field of view with information having increased magnification from the second camera, or
      ii. combining information from the second output image outside of a second zone of the field of view different from the first zone with information having increased magnification from the first camera,
   wherein the first and second distortion profiles respectively match requirements of a left eye and a right eye of a user at a display and are configured to minimize or avoid completely the processing of the distortion in the first and second images before they are displayed to the user, wherein the processing unit is further configured to pre-store difference information regarding the difference in the first and second camera distortion profiles of the first and second cameras, receive the difference information from a user, or receive the difference information from the first and second cameras written in a marker and/or metadata.

12. The system of claim 11, further comprising at least one display configured to display the first and second output images.

13. The system of claim 12 wherein the at least one display is on at least one of a head-mounted virtual reality headset, an augmented reality headset, or a mobile device capable of insertion into a headset.

14. The system of claim 11 wherein the first and second capture positions are modifiable to change the desired view of the scene.

15. An image acquisition system for analyzing information about a scene, the system comprising:
   a. a first camera having a plurality of first imaging parameters and a first capture position relative to the scene, the first camera being configured to capture a first output image of the scene;
   b. a second camera having a plurality of second imaging parameters and a second capture position relative to the scene, the second camera being configured to capture a second output image of the scene, the first and second capture positions being different from each other, one or more of the first imaging parameters being different from a corresponding one or more of the second imaging parameters, the first and second output images being different from each other according to the differing first and second capture positions and the one or more differing first and second imaging parameters;
   c. a processing unit connected to the first and second cameras, the processing unit being configured to:
      i. receive the first and second output images from the respective first and second cameras, and
      ii. process the first and second output images according to a geometrical difference due to parallax from the first and second capture positions and according to any remaining differences due to the one or more differing first and second imaging parameters, in order to analyze the scene,
   wherein the one or more differing first and second imaging parameters includes at least a difference in lens distortion profiles between the first and second cameras or a difference in camera distortion profiles between the first and second cameras, wherein the first camera has a camera distortion profile or a first lens of the first camera has a lens distortion profile with increased magnification in a first zone of a field of view and the second camera has a camera distortion profile or a second lens of the second camera has a lens distortion profile with increased magnification in a second zone of the field of view, the second zone being different than the first zone, and wherein, to create at least one combined image, the processing unit is further configured to at least one of:
  (1) combine information from the first output image outside of the first zone of the field of view with information having increased magnification from the second camera, or
  (2) combine information from the second output image outside of the second zone of the field of view with information having increased magnification from the first camera, wherein the processing unit is further configured to:
  iii. pre-store difference information regarding the difference in the field of view of each of the first and second cameras,
  iv. receive manual input of the difference information from a user, or
  v. receive the difference information from the first and second cameras written in a marker and/or metadata.

16. The system of claim 15, wherein the at least one combined image has enhanced image resolution.

17. The system of claim 15, wherein the at least one combined image includes 3D information.

* * * * *